United States Patent

Nakamura et al.

[11] 3,825,292
[45] July 23, 1974

[54] SHOCK ABSORBER FOR AUTOMOBILE BUMPERS

[75] Inventors: Kihei Nakamura, Yokohama; Harumichi Yamazaki, Tokyo; Hirotsugu Masuda; Takeshi Sato, both of Yokohama; Yoshinori Kiuchi, Itsukaichi, all of Japan

[73] Assignee: Bridgestone Tire Company Limited, Tokyo, Japan

[22] Filed: Jan. 31, 1973

[21] Appl. No.: 328,432

[30] Foreign Application Priority Data
Feb. 9, 1972  Japan.............................. 47-16368

[52] U.S. Cl.............................. 293/71 R, 267/140
[51] Int. Cl.............................................. B60r 19/06
[58] Field of Search............. 293/71 R, 88; 114/219; 267/139, 140, 141, 153

[56] References Cited
UNITED STATES PATENTS
3,335,689  8/1967  Hein................................. 293/71 R
3,508,744  4/1970  Kikukawa et al................... 267/139
3,600,896  8/1971  Tateisi................................ 114/219
3,690,280  9/1972  Narabu............................... 114/219

FOREIGN PATENTS OR APPLICATIONS
945,456  1/1964  Great Britain...................... 114/219

Primary Examiner—M. Henson Wood, Jr.
Assistant Examiner—Robert Saifer
Attorney, Agent, or Firm—Fleit, Gipple & Jacobson

[57]  ABSTRACT

A shock absorber for automobile bumpers comprising a hollow rubber body with a trapezoidal cross section, with closed top and side walls and an open bottom. The hardness of the rubber material and the $t/H$ ratio ($t$ being the side wall thickness and $H$ being the height of the trapezoidal hollow space) are such that the differential of the rate of increase of the load of the shock absorber for an increase of the deflection thereof is negative. Preferably, the $t/H$ ration is not smaller than 0.2 but not greater than 0.5.

1 Claim, 4 Drawing Figures

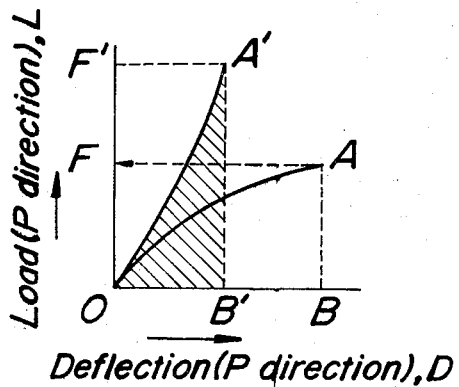
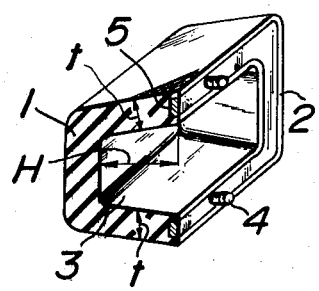
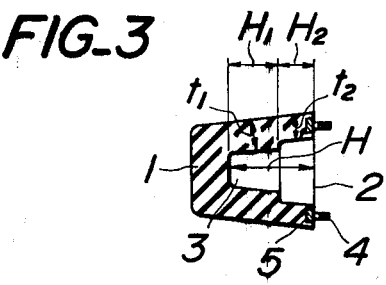
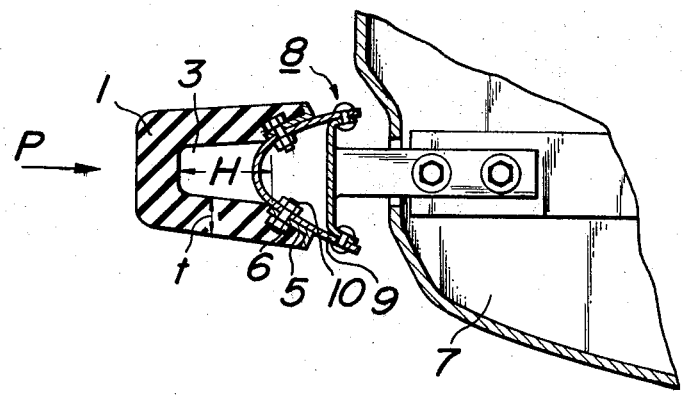

SHOCK ABSORBER FOR AUTOMOBILE BUMPERS

BACKGROUND OF THE INVENTION

1. Field of the Invention

This invention relates to a shock absorber for automobile bumpers or the like, and more particularly to a rubber shock absorber of simple construction which is to be used in an automobile bumper or the like for the purpose of buffering the impact at collision.

2. Description of the Prior Art

A shock absorber made of rubber or other suitable elastomer and having a trapezoidal cross section has been used with automobile bumpers. A conventional rubber or elastomeric shock absorber with a hollow trapezoidal cross section has a shortcoming in that it produces comparatively large load and deflection for a given amount of impact energy absorbed. The large load thus generated requires an increased strength of the mounting fixtures for connecting the shock absorber to a bumper or the like. Accordingly, the fixtures tend to become more expensive. To allow a large deflection, the shock absorber itself must be made large for absorbing a desired amount of impact energy, so that it requires more space and becomes bulkier and heavier. The increased size of the shock absorber means an increase of the cost, and it tends to result in a poor appearance of the automobile bumpers, especially in the case of passenger cars.

Therefore, an object of the present invention is to mitigate the aforesaid shortcomings of conventional shock absorbers by providing an improved shock absorber for automobile bumpers.

SUMMARY OF THE INVENTION

The inventors have found out that, in the case of a hollow rubber shock absorber, the magnitude of its load or deflection for a given amount of impact energy absorbed thereby is a function of impact absorbing efficiency $\eta$ of the shock absorber, as will be described hereinafter. More particularly, if the value of the impact absorbing efficiency $\eta$ to be defined hereinafter is greater than 50 percent, the load and the deflection of the shock absorber for a given impact absorption can be considerably reduced. To achieve such a high impact absorbing efficiency, the shock absorber should have a negative differential of the rate of increase of the load for an increase of the deflection thereof. The inventors have found out that such a high impact absorbing efficiency can be achieved if the shock absorber is allowed to buckle upon application of an impact thereto.

To ensure the desired high impact absorbing efficiency, the wall thickness $t$ of a shock absorber with a hollow trapezoidal cross section must be in a certain relation with the hight $H$ of the trapezoidal hollow space thereof; namely, the $t/H$ ratio should preferably be in a range of 0.2 (inclusive) to 0.5 (inclusive).

DESCRIPTION OF THE DRAWING

For a better understanding of the invention, reference is made to the accompanying drawing, in which:

FIG. 1 is a graph showing the load-deflection characteristics of rubber shock absorbers;

FIG. 2 is a schematic perspective view of a rubber shock absorber, according to the present invention;

FIG. 3 is a schematic sectional view of another rubber shock absorber, according to the present invention; and FIG. 4 is a schematic sectional view of another rubber shock absorber, according to the present invention, which is mounted on an automobile bumper.

Like parts are designated by like numerals throughout different figures of the drawing.

DETAILED DESCRIPTION OF THE PREFERRED EMBODIMENTS

Referring to FIG. 1, a conventional hollow rubber shock absorber has a load-deflection characteristic as shown by the curve $OA'$, which is upwardly concave. When the deflection of the conventional shock absorber is $B'$, the energy absorbed by it is represented by the area below the curve $OA'$, namely, the hatched area $OA'B'$. Accordingly, the impact absorbing efficiency $\eta$ of the shock absorber can be defined as follows.

$$\eta = 100 \times \text{area } OA'B'/\text{area } OF'A'B'$$

here, $F'$ represents the load for the point $A'$.

Since the curve $OA'$ is upwardly concave and has a positive value of $d^2L/dD^2$, L representing the load and D representing the deflection, the aforesaid impact absorbing efficiency $\eta$ of the conventional shock absorber is less than 50 percent.

As can be seen from FIG. 1, in order to obtain an impact absorbing efficiency $\eta$ of greater than 50 percent, the load-deflection curve should be upwardly convex, or it should have a negative differential of the rate of increase of the load for an increase of the deflection, or it should have a negative value of $d^2L/dD^2$. The present invention has succeeded in providing such load-deflection characteristics, by allowing the shock absorber to buckle upon application of an impact thereto.

The shock absorber of the present invention is made of rubber or other suitable elastomer and has a hollow trapezoidal cross section with a similarly trapezoidal hollow space therein.

In a preferred embodiment of the present invention, as shown in FIG. 2, body 1 of the shock absorber is made of rubber and has a trapezoidal cross section with closed top and side walls and open bottom. A fixture 5 with bolts 4 is secured to the bottom edge 2 of the side wall of the body 1. Strong bondage of the fixture 5 to the body 1 may be obtained by connecting the fixture to the body before vulcanizing the body. A hollow space 3 is surrounded by the top and side walls of the body 1. When the side wall thickness is represented by $t$ and the height of the hollow space 3 taken at right angles to the plane of the bottom 2 is represented by $H$, the ratio $t/H$ must satisfy the following relation.

$$0.2 \leq t/H \leq 0.5$$

In another embodiment, as shown in FIG. 3, a side wall has two parts with different thicknesses $t_1$ and $t_2$. If the height of a trapezoidal space surrounded by the side wall with the thickness $t_1$ is given by $H_1$ and the similar height for the wall thickness $t_2$ is given by $H_2$, as shown in the figure, the following relations must be satisfied.

$$H_1 + H_2 = H$$
$$0.2 \leq (t_1H_1)/H + (t_2H_2)/H/H \leq 0.5$$

The dimensional requirement for the embodiment of FIG. 3 is essentially the same as that of FIG. 2.

FIG. 4 illustrates another embodiment of the invention, which has mounting fixtures 5 disposed at an angular relation to the bottom edge of a body 1. Each fixture 5 has nuts 6 to be embedded in body 1, so that the body 1 may be connected to a mounting member 9 of the bumper 8 of an automobile 7 by bolts 10. The shock absorbers of FIGS. 2 and 3 can be mounted on automobile bumpers in a manner similar to that of FIG. 4.

The rubber material for the body 1 according to the present invention should preferably have a hardness of 73 or more, as determined on the basis of the Shore A scale. Such rubber having a high hardness together with a rapid increase of elastic coefficient is desirable, because shock absorbers for automobile bumpers are required to be compact in size and light in weight.

When an impact load is applied to the body 1 of the shock absorber of the present invention, for instance in a direction of the arrow P of FIG. 4, the body 1 may buckle as the impact increases in excess of a certain level. Such buckling is ensured by the aforesaid condition of $0.2 \leq t/H \leq 0.5$. As a result, the load-deflection curve of the shcok absorber of the present invention becomes as shown by the upwardly convex curve OA of FIG. 1. Such load-deflection characteristics of the shock absorber of the present invention was confirmed by tests. The mounting fixture 5 connecting the body 1 to the automobile bumper 8 also acts to prevent the body 1 to excessively increase its impact-receiving area upon application of impact thereto, so as to ensure a high impact absorbing efficiency $\eta$.

As described in the foregoing disclosure, the present invention provides an improved shock absorber which has a high impact absorbing efficiency ($\eta$ greater than 50 percent) and yet is very simple in construction and easy to manufacture. Thus, the invention contributes greatly to the industry.

We claim:

1. A shock absorber for automobile bumpers, comprising a hollow body with a trapezoidal cross section, the body being made of a rubber with a Shore A hardness of not smaller than 73, the body having a closed top wall, closed side walls and open bottom edges, the thickness "$t$" of the side walls being so related with the height "$H$" of the hollow space in the body taken at right angles to a plane of the bottom edges that the ratio $t/H$ is not smaller than 0.2 but not greater than 0.5, and a mounting fixture secured to the bottom edge of the body, said mounting fixture forming a closed loop along the bottom edge of the body, said side walls of the body having two portions with respective thicknesses "$t_1$" and "$t_2$" wherein "$t_1$" is greater than "$t_2$," said two portions surrounding hollow spaces at portions of heights "$H_1$" and "$H_2$" while satisfying the relations that $$H_1 + H_2 = H, \text{ and}$$
$$0.2 \leq (t_1H_1)/H + (t_2H_2)/H/H \leq 0.5.$$

* * * * *